United States Patent [19]

Kagiya et al.

[11] 3,979,482

[45] Sept. 7, 1976

[54] PROCESS FOR THE DEGRADATION OF HIGH POLYMER SUBSTANCES

[75] Inventors: Tsutomu Kagiya, Kyoto; Kunihiko Miyoshi, Takatsuki; Katsuo Takemoto, Kyoto, all of Japan

[73] Assignees: Tsutomu Kagiya, Kyoto; Shinetsu Chemical Company; Tekkosha Co., Ltd., both of Tokyo, all of Japan

[22] Filed: Nov. 29, 1974

[21] Appl. No.: 528,081

Related U.S. Application Data

[62] Division of Ser. No. 361,792, March 18, 1973, abandoned.

[52] U.S. Cl. ................... 260/897 C; 260/31.2 R; 260/32.8 A; 260/33.2 R; 260/33.4 PQ; 260/33.8 UA; 260/898; 260/899; 260/DIG. 43

[51] Int. Cl.² ............................................. C08J 3/20

[58] Field of Search ............... 260/DIG. 43, 897 C, 260/898, 899, 31.2 R, 32.8 A, 33.2 R, 33.4 PQ, 33.8 UA

[56] References Cited
UNITED STATES PATENTS

| | | | |
|---|---|---|---|
| 3,759,807 | 9/1973 | Osborn et al. | 260/DIG. 43 |
| 3,797,690 | 3/1974 | Taylor et al. | 260/DIG. 43 |
| 3,798,187 | 3/1974 | Miyoshi et al. | 260/DIG. 43 |
| 3,830,764 | 8/1974 | Hudgin et al. | 260/DIG. 43 |

OTHER PUBLICATIONS

Light sensitive systems, Wiley and Sons, 1965 pp. 180–183.

*Primary Examiner*—Eugene C. Rzucidlo
*Attorney, Agent, or Firm*—Woodhams, Blanchard and Flynn

[57] ABSTRACT

The oxidation of a high polymer such as polyvinyl chloride or polyolefin, which oxidation causes cleavages of carbon-carbon bonds in the main chains thereof to degrade the high polymer into lower molecular weight compounds, is remarkably accelerated when the high polymer is impregnated with a halogenated compound having a carbonyl group or carbonyl groups and exposed to sunlight or is irradiated with ultraviolet radiation in an ambient atmosphere of oxygen or a gas containing oxygen. This acceleration of the oxidation makes possible easy destruction of a shaped article made of such a high polymer.

36 Claims, No Drawings

PROCESS FOR THE DEGRADATION OF HIGH POLYMER SUBSTANCES

This is a division of application Ser. No. 361,792, filed May 18, 1973, now abandoned.

BACKGROUND OF THE INVENTION

1. Field of the Invention

This invention relates to a process for degrading high polymers and more particularly to a process for destroying a shaped article made of a high polymer for easy waste disposal.

2. Description of the Prior Art

In response to demands for shaped articles made of synthetic polymers, i.e., plastic products which possess excellent durability for use including in the outdoors, their production has been recently increased remarkably and this has been accompanied by an increase of waste products thereof. The durability of shaped articles made of such a polymer may be easily seen from the fact, for example, that a sheet of plasticized polyvinyl chloride of 0.08 mm in thickness for agricultural use can be first manually crushed after the sheet is oxidized for 1,200 hours in air at 45°C. under ultraviolet radiation emitted from a high pressure mercury vapor lamp of 1.2 K. watts capacity spaced from the sheet at a distance of 50 cm. This high durability which is desired when the plastic products are in practical use, causes a very serious problem of waste disposal thereof. It is very urgent to solve this problem in order to prevent environmental pollution, since natural decay thereof can hardly be expected.

For this purpose, there have been studied and proposed many processes including mechanical crushing, application of chemicals, subjecting to photo-oxidation, biodegradation using a microorganism and incineration, all of which have, however, individual deficiencies. For example, an attempt has been made which comprises incorporating a ketone compound into a high polymer and subjecting the polymer to irradiation of light in the presence of ambient oxygen to cause oxidation of the polymer, whereby the polymer is degraded. However, this process using the saturated or unsaturated ketone compound such as acetone or methyl vinyl ketone still involves a disadvantage that the oxidation rate of the polymer is extremely slow.

SUMMARY OF THE INVENTION

A main object of this invention is to provide a process for degrading a high polymer substance by photo-oxidation of the high polymer.

Another object of this invention is to provide a process for the waste disposal of a shaped article made of a high polymer by utilizing the photo-oxidation reaction and using an accelerator for the reaction, thereby preventing environmental pollution.

A further object of this invention is to provide a process for the rapid destruction of a shaped article made of a high polymer utilizing the oxidation that easily takes place in the high polymer under ultraviolet irradiation or sunlight without using means such as mechanical crushing.

The present invention is based on the discovery that an article made of a high polymer is degraded under ultraviolet irradiation or sunlight in the presence of a halogenated compound having a carbonyl group or carbonyl groups (hereinafter, this compound is referred to as "halogenated carbonyl compound") in an ambient atmosphere of oxygen or a gas containing oxygen. In more detail, a small amount of the halogenated carbonyl compound which has been incorporated into a plastic product such as one made of polyvinyl chloride or polyolefin, absorbs energy on exposure to ultraviolet irradiation or sunlight to cause cleavages of the carbon-halogen bonds thereof to produce free radicals which react with hydrogen atoms attached to the carbons of the main bonding chains in the polymer, whereby the oxidation reaction of the polymer is accelerated resulting in the destruction of the plastic product.

As the high polymer and the shaped article made thereof, to be treated by the present invention, there can be mentioned a polyolefin such as polyethylene or polypropylene; a polymer such as polyvinyl chloride, polystyrene, or polyacrylonitrile; a variety of polymers derived therefrom by a chemical modification such as unsaturation or ketonization thereof; or a mixture thereof, and also a wide variety of articles in the form of films, fibers or molded products made of the above mentioned high polymer.

Referring to the shaped articles of polyvinyl chloride, one of the specified examples of the present invention, this article includes among others a plasticized or unplasticized film or a molded article comprising a homopolymer, copolymer or block copolymer of vinyl chloride or a blended mixture thereof.

This invention can be also applied to an article made of a post-chlorinated polymer such as chlorinated polyethylene.

The halogenated carbonyl compound used in this invention as the reaction accelerator may be obtained by halogenation, i.e., by reacting a variety of compounds having a carbonyl group or carbonyl groups with bromine, chlorine or iodine, or a mixture thereof.

Examples of the halogenated carbonyl compounds thus obtained include a compound derived from the halogenation of a saturated ketone such as acetone, acetyl acetone or biacetyl; an unsaturated ketone such as methyl vinyl ketone; a saturated aldehyde such as acetaldehyde; an unsaturated aldehyde such as acrolein; an aromatic or saturated cyclic ketone such as cyclohexanone, phenacyl acetone, or benzophenone; carbon monoxide-containing polyketone type copolymers such as a copolymer prepared by a copolymerization of carbon monoxide with ethylene and vinyl chloride; and a polymer prepared from an unsaturated ketone such as methyl vinyl ketone by the bond-opening at the unsaturated bonds of the ketone.

The optimum amount of the halogenated carbonyl compound may vary depending on the high polymer article to be treated and the desired oxidation rate of the polymer, but from about 0.1 to about 20 weight %, preferably from about 0.3 to about 3.0 weight %, based on the weight of the polymer, is usually employed.

The addition of the halogenated carbonyl compound into the high polymer is referred in general throughout this description as being performed by impregnation into the shaped article made of the high polymer, but this can be effected in advance to the shaping of the polymer together with or without a plasticizer.

The impregnation of this compound into the high polymer article according to this invention may be carried out by dipping the shaped high polymer article into a liquid of the halogenated carbonyl compound or an intimate mixture of the compound with a solvent such as acetone, ether, esters or halogenated hydrocarbons, or by coating or spraying the above liquid or a mixture thereof onto the article.

As the solvent in this case, there may be employed acetone, methyl vinyl ketone, ether, alcohol, esters, halogenated hydrocarbons or the like, and the solvent acts to extract the stabilizer contained in the high polymer article, to swell the article so that the halogenated carbonyl compound easily penetrates into the article to prevent this compound from volatilizing away, and further to additionally accelerate the degradation of the high polymer caused by the irradiation in the presence of the halogenated carbonyl compound. The solvent is preferably used in the form of a mixture of two or more than two kinds of individual solvents so that the above mentioned objects are simultaneously achieved.

When an article of a non-chlorinated high polymer is used as the high polymer article of this invention, it is very effective that the article further contains a chlorinated polymer. This chlorinated polymer incorporated with the non-chlorinated polymer improves the penetration and the compatibility of the halogenated carbonyl compound on impregnation of the latter compound, to ensure a homogeneous distribution of the latter compound, and further accelerates the photo-oxidation of the article, thereby the chlorinated polymer cooperates with the halogenated carbonyl compound on exposure of the article to ultraviolet irradiation, since the chlorinated polymer also supplies free radicals generated by the irradiation which affect the non-chlorinated polymer to accelerate additionally the photo-oxidation thereof.

The above described non-chlorinated polymer article includes fibers, films or other shapes of moulded products of polyolefins such as polyethylene or polypropylene, polyvinyls such as polystyrene or polyacrylonitrile, or modifications thereof produced by means of, for example, unsaturation or ketonization; and a mixture thereof.

By the term "chlorinated polymer" is meant a material produced by chlorinating a polymer compatible with the non-chlorinated polymer. The chlorination is preferably carried out to the extent that about 10 to about 50 % of the hydrogen atoms existing in the starting polymer are replaced by chlorine atoms when a polyolefin such as polyethylene is chlorinated.

In this case the amount of the chlorinated polymer and halogenated carbonyl compound to be added are preferably from about 5 to about 50 weight parts and from about 0.1 to about 10 weight parts, respectively, both per 100 weight parts of the non-chlorinated polymer.

According to the present invention, the treatment of waste plastic articles of a high polymer can be carried out without use of any mechanical apparatus or incineration, since the articles can be easily degraded without causing any environmental pollution.

DETAILED DESCRIPTION OF THE PREFERRED EMBODIMENTS

EXAMPLE 1

Into specimens of a film of plasticized polyvinyl chloride of 0.10 mm thickness for agricultural use there was impregnated a chlorinated carbonyl compound by spraying a liquid or a solution thereof until the specimens increased by 10 % in their weight. The compounds employed are listed in Table 1 together with the solvent used for preparing the solution. The specimens thus obtained were irradiated with ultraviolet radiation emitted from a cylindrical high pressure mercury vapor lamp of 1.2 K. watts capacity arranged spaced therefrom by 50 cm. in air at 43°C for 24 hours.

The irradiated specimens were immersed into ether, extracted for 48 hours, and dried in vacuo. The IR-absorptions of the specimens were measured at wave numbers of 1712 cm$^{-1}$, 1721 cm$^{-1}$, 1733 cm$^{-1}$ which were due to the carbonyl structures of aldehyde-, ketone- and carboxylic acid-radicals, respectively. Other specimens which were impregnated as described above with the reagents, but not irradiated, were extracted with ether and dried and the IR-absorptions were measured in the same way as above for reference purposes.

The mean oxidation rate during the 24 hours-irradiation, $V_o$, which is defined as the increase in the number of the carbonyl structures per every $10^3$ carbon atoms of the polymer per hour, was calculated by the following equation (Preservation of Beer's Law was assumed):

$$V_o = \frac{1}{d\,t}\left[K_1(\frac{1}{l_1}A_{11} - \frac{1}{l_0}A_{10}) + K_2(\frac{1}{l_1}A_{21} - \frac{1}{l_0}A_{20}) + K_3(\frac{1}{l_1}A_{31} - \frac{1}{l_0}A_{30})\right]$$

where;

$K_1$, $K_2$ and $K_3$ were predetermined coefficients as to the numbers of carbonyl structures corresponding to aldehyde-, ketone- and carboxylic acid-radicals, respectively;

$d$ was the density of the specimens in g./cc;

$l_1$ and $l_0$ were the lengths of the optical paths of IR-beam in the irradiated and non-irradiated specimens, respectively;

$t$ was the irradiation time in hour, that is 24 hours in this case;

$A_{10}$, $A_{20}$ and $A_{30}$ were optical absorbances of the non-irradiated specimens at the wave numbers of 1712 cm$^{-1}$, 1721 cm$^{-1}$ and 1733 cm$^{-1}$, respectively; and $A_{11}$, $A_{21}$ and $A_{31}$ were optical absorbances of the irradiated specimens at the above wave numbers in the above-stated order.

The specified values adopted for the above mentioned coefficients were 0.267 as to $K_1$, 0.661 for $K_2$ and 0.868 for $K_3$ which were previously given in J. Polymer Sci., 13, 535(1954).

The calculated $V_o$ values are listed in Table 1.

Table 1

| Chlorinated carbonyl compound | Solvent used for the preparation of the solution | Content of chlorinated carbonyl compound in the solution (% by volume) | Oxidation rate $V_o \times 10^2$ | Remark |
|---|---|---|---|---|
| Acetyl chloride | Acetone | 10 | 5.5 | |
| Trichloroacetyl chloride | Acetone | 10 | 6.2 | |
| Symmetrical dichloroacetone | Acetone | 10 | 5.2 | |
| Hexachloroacetone | None | 100 | 17 | |
| Hexachloroacetone | Acetone | 10 | 19 | |
| Hexachloroacetone | Methyl vinyl ketone | 50 | 17 | |
| Hexachloroacetone | Ether | 10 | 20 | |
| Chloranil | Acetone | 10 | 8.6 | |
| None was sprayed | | — | 1.0 | Reference |
| None was added | Acetone | 0 | 3.0 | Reference |

EXAMPLE 2

Into specimens of a film of plasticized polyvinyl chloride of 0.10 mm in thickness for agricultural use there are impregnated a brominated carbonyl compound by coating thereon an acetone solution containing 10 % by volume of the compound until the specimens increased by 10 % in their weight. The compounds tested are listed in Table 2. The specimens were irradiated under the same conditions as in Example 1. Thereafter the specimens were extracted and dried for the measurement of the IR-absorptions of the specimens in the same way as in Example 1, and the calculation of the oxidation rate was also carried out in the same manner as in Example 1. The results are listed in Table 2.

Table 2

| Brominated carbonyl compound | Oxidation rate $V_o \times 10^2$ | Remark |
|---|---|---|
| Acetyl bromide | 11.7 | |
| Bromacetophenone | 12.8 | |
| Monobromacetyl bromide | 12.9 | |
| None was sprayed | 1.0 | Reference |
| Only acetone containing no solute was sprayed | 3.0 | Reference |

EXAMPLE 3

Specimens of a film of plasticized polyvinyl chloride of 0.10 mm in thickness for agricultural use were dipped into a liquid or a solution in acetone of a halogenated carbonyl compound identified in Table 3. The immersion was continued for 30 seconds. The specimens were then irradiated under the same conditions as in Example 1. The IR-absorptions of the specimens were measured after the specimens were extracted with ether and dried in the same manner as in Example 1, for the calculation of the oxidation rate. The calculation results obtained in the same way as in Example 1 are listed in Table 3.

Table 3

| Halogenated carbonyl compound | Solvent used for the preparation of the solution | Mixing ratio of the halogenated carbonyl compound to the solvent | Oxidation rate $V_o \times 10^2$ | Remark |
|---|---|---|---|---|
| Hexachloroacetone | None | | 13.8 | |
| Acetylchloride | Acetone | 10:90 | 20.8 | |
| Acetylbromide | Acetone | 10:90 | 6.39 | |
| Monochloroacetone | Acetone | 10:90 | 15.5 | |
| Symmetrical dichloroacetone | Acetone | 10:90 | 20.8 | |
| Hexachloroacetone | Acetone | 10:90 | 34.2 | |
| No immersion was carried out | | | 0.72 | Reference |
| None | Acetone | — | 3.03 | Reference |

EXAMPLE 4

Specimens of a variety of non-chlorinated polymer films were impregnated with a 10 volume percent solution of hexachloroacetone acetone until the specimens increased by 10 % in their weight. These specimens were irradiated with ultraviolet radiation under the same conditions as in Example 1. The IR-absorptions of the specimens were measured after the specimens were extracted with ether and dried, for the calculation of the oxidation rate. The procedures were repeated except that no impregnation of hexachloroacetone was carried out for the comparison. The calculation results are listed in Table 4.

Table 4

| Raw material for the film | Thickness of the film (m.m.) | Oxidation rate when hexachloroacetone was impregnated $V_o \times 10^2$ | Oxidation rate when hexachloroacetone was not impregnated $V_o \times 10^2$ |
|---|---|---|---|
| Polyethylene | 0.20 | 1.49 | 0.98 |

Table 4-continued

| Raw material for the film | Thickness of the film (m.m.) | Oxidation rate when hexachloroacetone was impregnated $V_o \times 10^2$ | Oxidation rate when hexachloroacetone was not impregnated $V_o \times 10^2$ |
|---|---|---|---|
| Blended mixture of polyethylene with chlorinated polyethylene* | 0.20 | 7.63 | 3.14 |
| Polystyrene | 0.20 | 17.9 | 0.00 |
| Blended mixture of polystyrene with chlorinated polyethylene* | 0.20 | 26.0 | 2.38 |
| Polypropylene | 0.15 | 2.80 | 0.37 |
| Blended mixture of polypropylene with chlorinated polyethylene* | 0.15 | 3.24 | 0.94 |

Note: *The chlorinated polyethylene was prepared by chlorinating polyethylene to the extent that 40% of hydrogen atoms of the polyethylene were substituted with chlorine atoms and the content of the chlorinated polyethylene in the mixture was 10% by weight based on the weight of the mixture.

EXAMPLE 5

The influences of the blending of a chlorinated polymer on the oxidation rate of polyethylene were studied in relation to the blending amount of the first polymer to the second polymer. Polyethylene of 0.920 g./cc. in density and chlorinated polyethylene prepared by chlorinating polyethylene to the extent that 40 % of hydrogen atoms of the polyethylene were replaced with chlorine atoms, were used as the above first and second polymers, respectively. A solution of 10 % by volume of hexachloracetone in acetone was admixed to the polymers during the blending thereof. The added amount of the solution was 10 % by weight based on the total amount of the polymers. The irradiation and the following extraction as well as the measurement and the calculation were carried out under the same conditions and in the same way as in Example 1. The procedures were repeated as to the blended polymers which, however, did not contain hexachloracetone, for purposes of comparison. The results are shown in Table 5.

Table 5

| Content of the chlorinated polyethylene in per cent by weight based on the weight of the blended polymer | 0 | 5 | 10 | 20 | 30 |
|---|---|---|---|---|---|
| Oxidation rate ($V_o \times 10^2$) | 17.9 | 22.0 | 26.0 | 36.0 | 43.0 |
| Oxidation rate ($V_o \times 10^2$) (In case of excluding hexachloracetone) | 0.0 | 1.5 | 2.4 | 4.7 | 7.0 |

EXAMPLE 6

Example 4 was repeated except that there were used several different kinds of halogenated carbonyl compounds in place of the hexachloroacetone and also employing a common thicknesses of the polymer films instead of two different thicknesses thereof. The results are shown in Table 6.

Table 6

| Raw material for the film | Oxidation rate when the halogenated carbonyl compound was not applied $V_o \times 10^2$ | Halogenated carbonyl compound applied | Oxidation rate when the halogenated carbonyl compound was applied $V_o \times 10^2$ |
|---|---|---|---|
| Polyethylene | 0.98 | Benzoyl bromide | 1.86 |
| Blended mixture of polyethylene with chlorinated polyethylene* | 3.14 | Phenacyl bromide | 6.65 |
| | | Acetyl iodide | 4.31 |
| Polystyrene | 0.00 | Benzoyl bromide | 18.8 |
| Blended mixture of polystyrene with chlorinated polyethylene* | 2.38 | Bromoacetyl bromide | 14.5 |
| | | Phenacyl bromide | 18.3 |

Note: *The chlorinated polyethylene was prepared by chlorinating polyethylene to the extent that 40% of hydrogen atoms of the polyethylene were substituted with chlorine atoms and the content of the chlorinated polyethylene in the mixture was 10% by weight based on the weight of the mixture.

EXAMPLE 7

Specimens of a film of plasticized polyvinyl chloride of 0.10 mm in thickness for agricultural use were dipped into a 5 % by volume solution of hexachloroacetone in acetone for 30 seconds. Then, the specimens were exposed in the outdoors to sunlight for 8 days in the summer time (from Aug. 17, 1972 to Aug. 24, 1972). At the same time the specimens which had not been dipped were also exposed in parallel with the exposure of the dipped specimens. Changes in the average molecular weight of the polymer were determined according to the viscosity method of ASTM D-1243 except for using nitrobenzene as the solvent in place of cyclohexanone. The exposure time to the sunlight was assumed to be 12 hours each day. The results are shown in Table 7.

Table 7

| | Average molecular weight | |
|---|---|---|
| Exposure time (hours) | Specimen not dipped | Specimen dipped into the hexachloroacetone solution |
| 0 | 1050 | 1060 |
| 4 | 1020 | 900 |
| 28 | 1060 | 550 |
| 64 | 1040 | 540 |
| 88 | 1070 | 580 |

EXAMPLE 8

The specimens both dipped and not dipped were prepared in the same way as in Example 7. Both series of the specimens were exposed to the irradiation of Xenon light in a weatherometer (Xenon weathering tester Model 25 XH made by Toyo Seiki Co., Japan) without spraying. In the course of the exposure, the tensile strengths of the specimens as well as the elongations thereof were measured on the test pieces of Dumbbell No. 1 prepared from the specimens using an Instron-type instrument made by Shimazu, Japan, under the conditions of an extension rate of 50 mm/min. and at a temperature of 23°C. The results are shown in Table 8.

Table 8

| Exposure time in the weatherometer (hour) | | 0 | 5 | 10 | 15 | 20 | 30 |
|---|---|---|---|---|---|---|---|
| Specimen dipped into the hexachloroacetone solution | Tensile strength* | 233 | 219 | 203 | 158 | 123 | —*** |
| | Elongation** | 293 | 196 | 94 | 0 | 0 | —*** |
| Specimen not dipped | Tensile strength* | 271 | 311 | 286 | 289 | 303 | 292 |
| | Elongation** | 230 | 240 | 236 | 227 | 225 | 232 |

Notes:
*unit is K.g./cm.
**The unit is %.
***The measurement can not be effected since the specimen was self-destructed.

The embodiments of the present invention in which an exclusive property or privilege is claimed are defined as follows:

1. A process for degrading a polymer composition, consisting essentially of the steps of:
    1. impregnating a polymer composition consisting essentially of a blend of
        A. polyethylene, and
        B. from about 5 to about 50 parts by weight, per 100 parts by weight of (A), of chlorinated polyethylene, said chlorinated polyethylene containing from about 10% to about 50% of chlorine atoms, based on the sum of the hydrogen and chlorine atoms thereof,
    with
        C. from about 0.1 to about 10% by weight, based on the weight of (A), of a halogenated carbonyl compound selected from the group consisting of halogen-substituted ketones, halogen-substituted aldehydes, halogen-containing polyketone copolymers and halogen-containing polymers of an unsaturated ketone obtained by bond opening of the unsaturated bonds of the ketone, wherein said halogen is selected from the group consisting of chlorine, bromine and iodine, and mixtures thereof, and
    2. exposing the impregnated polymer composition from step (1) to ultraviolet irradiation or sunlight, in the presence of oxygen or a gas containing oxygen.

2. The process according to claim 1 wherein the halogenated carbonyl compound is a member selected from the group consisting of halogenated acetone, halogenated acetyl acetone, halogenated biacetyl, halogenated methyl vinyl ketone, halogenated acetaldehyde, halogenated acrolein, halogenated cyclohexanone, halogenated phenacyl acetone, halogenated benzophenone, acetyl halide and halogenated acetyl halide.

3. A process as claimed in claim 1 wherein said halogenated carbonyl compound is halogen-substituted acetone.

4. A process as claimed in claim 3 in which said halogen-substituted acetone is selected from the group consisting of symdichloroacetone and hexachloroacetone.

5. A process as claimed in claim 1 wherein said halogenated carbonyl compound is hexachloroacetone.

6. A process as claimed in claim 1 wherein said halogenated carbonyl compound is an acetyl halide or a halogenated acetyl halide.

7. A process as claimed in claim 1 wherein said halogenated carbonyl compound is selected from the group consisting of acetyl chloride, trichloroacetyl chloride, acetyl bromide, bromoacetyl bromide and acetyl iodide.

8. A process as claimed in claim 1 in which said halogenated carbonyl compound is chloranil.

9. A process as claimed in claim 1 in which said halogenated carbonyl compound is a benzoyl halide.

10. A process as claimed in claim 9 in which said benzoyl halide is benzoyl bromide.

11. A process as claimed in claim 1 in which said halogenated carbonyl compound is a phenacyl halide.

12. A process as claimed in claim 11 in which said phenacyl halide is phenacyl bromide.

13. A process as claimed in claim 1 in which said halogenated carbonyl compound is a halogenated acetophenone.

14. A process as claimed in claim 13 in which said halogenated acetophenone is bromoacetophenone.

15. A process as claimed in claim 1 in which said halogenated carbonyl compound is impregnated in the form of an intimate mixture thereof with an organic solvent selected from the group consisting of acetone, methyl vinyl ketone, an alcohol, an ether, an ester, a halogenated hydrocarbon, and mixtures thereof.

16. A process as claimed in claim 5 in which said halogenated carbonyl compound is impregnated in the form of an intimate mixture thereof with an organic solvent selected from the group consisting of acetone, methyl vinyl ketone, an alcohol, an ether, an ester, a halogenated hydrocarbon, and mixtures thereof.

17. A process as claimed in claim 16 wherein the polymer composition is in the form of a molded film.

18. A process as claimed in claim 1 wherein the polymer composition is in the form of a shaped article.

19. A process for degrading a polymer composition, consisting essentially of the steps of
    1. impregnating a polymer composition consisting essentially of a blend of
        A. polystyrene, and
        B. from about 5 to about 50 parts by weight, per 100 parts by weight of (A), of chlorinated polyethylene, said chlorinated polyethylene containing from about 10% to about 50% of chlorine atoms, based on the sum of the hydrogen and chlorine atoms thereof,
    with
        C. from about 0.1 to about 10% by weight, based on the weight of (A), of a halogenated carbonyl compound selected from the group consisting of halogen-substituted ketones, halogen-substituted aldehydes, halogen-containing polyketone copolymers and halogen-containing polymers of an unsaturated ketone obtained by bond opening of the unsaturated bonds of the ketone, wherein said halogen is selected from the group consisting of chlorine, bromine and iodine, and mixtures thereof, and 2. exposing the impregnated polymer composition from step 1 to ultraviolet irradiation or sunlight, in the presence of oxygen or a gas containing oxygen.

20. A process as claimed in claim 19 wherein said halogenated carbonyl compound is halogen-substituted acetone.

21. A process as claimed in claim 20 in which said halogen-substituted acetone is selected from the group consisting of symdichloroacetone and hexachloroacetone.

22. A process as claimed in claim 19 wherein said halogenated carbonyl compound is hexachloroacetone.

23. A process as claimed in claim 19 wherein said halogenated carbonyl compound is an acetyl halide or a halogenated acetyl halide.

24. A process as claimed in claim 19 wherein said halogenated carbonyl compound is selected from the group consisting of acetyl chloride, trichloroacetyl chloride, acetyl bromide, bromoacetyl bromide and acetyl iodide.

25. A process as claimed in claim 19 in which said halogenated carbonyl compound is chloranil.

26. A process as claimed in claim 19 in which said halogenated carbonyl compound is a benzoyl halide.

27. A process as claimed in claim 26 in which said benzoyl halide is benzoyl bromide.

28. A process as claimed in claim 19 in which said halogenated carbonyl compound is a phenacyl halide.

29. A process as claimed in claim 18 in which said phenacyl halide is phenacyl bromide.

30. A process as claimed in claim 19 in which said halogenated carbonyl compound is a halogenated acetophenone.

31. A process as claimed in claim 30 in which said halogenated acetophenone is bromoacetophenone.

32. A process as claimed in claim 19 in which said halogenated carbonyl compound is impregnated in the form of an intimate mixture thereof with an organic solvent selected from the group consisting of acetone, methyl vinyl ketone, an alcohol, an ether, an ester, a halogenated hydrocarbon and mixtures thereof.

33. A process as claimed in claim 22 in which said halogenated carbonyl compound is impregnated in the form of an intimate mixture thereof with an organic solvent selected from the group consisting of acetone, methyl vinyl ketone, an alcohol, an ether, an ester, a halogenated hydrocarbon and mixtures thereof.

34. A process as claimed in claim 33 wherein the polymer composition is in the form of a molded film.

35. A process as claimed in claim 19 wherein the polymer composition is in the form of a shaped article.

36. The process according to claim 19 wherein the halogenated carbonyl compound is a member selected from the group consisting of halogenated acetone, halogenated acetyl acetone, halogenated biacetyl, halogenated methyl vinyl ketone, halogenated acetaldehyde, halogenated acrolein, halogenated cyclohexanone, halogenated phenacyl acetone, halogenated benzophenone, acetyl halide and halogenated acetyl halide.

* * * * *

UNITED STATES PATENT AND TRADEMARK OFFICE
CERTIFICATE OF CORRECTION

PATENT NO. : 3 979 482
DATED : September 7, 1976
INVENTOR(S) : Tsutomu Kagiya, Kunihiko Miyoshi and Katsuo Takemoto It is certified that error appears in the above-identified patent and that said Letters Patent are hereby corrected as shown below:

Title page at [62]; change "March 18, 1973" to ---May 18, 1973---.

Column 12, line 3; change "Claim 18" to ---Claim 28---.

Signed and Sealed this

First Day of February 1977

[SEAL]

Attest:

RUTH C. MASON
*Attesting Officer*

C. MARSHALL DANN
*Commissioner of Patents and Trademarks*